United States Patent [19]
Takahashi et al.

[11] 3,919,440
[45] Nov. 11, 1975

[54] SHATTERPROOF GLASS BOTTLE

[75] Inventors: Akikazu Takahashi, Matsudo; Yuji Futatsugi, Chiba; Takamu Yao, Narashino; Yoichi Higashide, Chiba, all of Japan

[73] Assignee: Dainippon Ink & Chemicals Inc., Tokyo, Japan

[22] Filed: Mar. 18, 1974

[21] Appl. No.: 452,330

[52] U.S. Cl. ............ 428/35; 215/DIG. 6; 427/407; 428/442; 428/515; 428/520; 428/522
[51] Int. Cl.$^2$ .................... B44D 1/14; C03C 17/32
[58] Field of Search ............ 117/94, 124 E, 161 UT; 215/DIG. 6; 427/407; 428/35, 442, 515, 520, 522

[56] References Cited
UNITED STATES PATENTS

| | | | |
|---|---|---|---|
| 3,379,559 | 4/1968 | Gerhardt | 117/124 X |
| 3,772,061 | 11/1973 | McCoy | 117/94 X |
| 3,823,032 | 7/1974 | Ukai | 117/124 X |

*Primary Examiner*—Michael R. Lusignan
*Attorney, Agent, or Firm*—Sherman & Shalloway

[57] ABSTRACT

A glass bottle in which shattering or scattering of broken glass pieces is prevented at the time of the breakage of the bottle. Such bottle is obtained by forming a rubber coating to a dried thickness of 50 – 300 microns on the outer surface of a bottle by application of a latex of a copolymer comprising (1) 25 – 70% by weight of butadiene, (2) 0.5 – 10% by weight of a monoethylenically unsaturated carboxylic acid and (3) 20 – 74.5% by weight of at least one vinyl compound selected from the group consisting of styrene, alpha-methylstyrene, methyl (meth)acrylate, ethyl (meth)acrylate, butyl (meth)acrylate, 2-ethylhexyl (meth)acrylate, octyl (meth)acrylate, beta-hydroxyethyl (meth)acrylate, beta-hydroxypropyl (meth)acrylate, glycidyl (meth)acrylate, vinyl chloride, vinylidene chloride, divinylbenzene, acrylamide, methacrylamide, N-methylol(meth)-acrylamide, vinyl pyridine, and (meth)acrylonitrile.

6 Claims, No Drawings

SHATTERPROOF GLASS BOTTLE

This invention relates to a shatterproof glass bottle. More specifically, the invention relates to a new glass bottle whose outer surface has a coating of rubber formed by means of a copolymer latex, with the consequence that shattering or scattering of broken glass pieces at the time of the breakage of the coated glass bottle is prevented.

Glass bottles are in wide use as beer bottles, cola bottles and other carbonated beverage bottles, aerosol containers, etc., in which a rise in internal pressure takes place due to the contents thereof. However, they are susceptible to breakage by shocks. Moreover, when they break, the broken glass pieces of the glass bottle shatter and scatter with violent force. Again, the chance of the glass bottles becoming scratched as a result of their contact with other bottles, containers and surrounding articles is relatively great. Hence, the strength of the glass bottles is reduced by such scratches. As a consequence, those bottles such as beer bottles, cola bottles and other carbonated beverage bottles which are used repeatedly are especially susceptible to breakage and are thus exceedingly dangerous.

It is known to apply a resinous coating to the outer surface of a glass bottle to prevent its breakage and thus prevent the shattering or scattering of broken glass pieces in case it should break. Lately, it has been proposed to use either a polyurethane solution or a butadiene-styrene block copolymer solution. However, since an organic solvent is used in these methods, there involves such possibilities as dangers of fire or explosion, adverse effects on the human body, and pollution of air. Again, a method of electrostatic coating or fluidized coating of a resinous powder such as of ethylenevinyl acetate copolymer has also been suggested. However, in these coating methods there is not only the danger of the powder exploding by electrification but also difficulty is involved in controlling the thickness of the coating. As methods other than those described above, one consisting in coating the glass bottle with a water-soluble acrylic resin and another consisting in coating the bottle with an emulsion of a polyacrylic acid ester have been attempted. However, the former is not completely safe because of its large content of a hydrophilic organic solvent such as alcohol or ether. On the other hand, the latter is defective in that the coating's resistance to alkalis and water are poor. When the latter emulsion is cross-linked by the addition thereto of a melamine-urea resin, an improvement in the coating's resistance to alkalis and water is achieved. On the other hand, the effects of preventing the shattering or scattering of the broken glass pieces at the time of the breakage of the bottle becomes inadequate.

Since the coated glass bottle must be washed each time it is used, the coating layer must have good resistance to water as well as alkalis.

An object of the present invention is therefore to provide a glass bottle coating agent which not only does not require the use of an organic solvent in its coating and can be applied with the conventional coating apparatus, but also in which the resulting coating layer has adequate effects in preventing the shattering or scattering of broken glass pieces when the bottle is broken as well as good resistances to water and alkalis. Another object is to provide a glass bottle coated with such an agent.

It has now been found that a copolymer latex containing (1) 25 – 70% by weight of butadiene, (2) 0.5 – 10% by weight of a monoethylenically unsaturated carboxylic acid and (3) 20 – 74.5% by weight of at least one vinyl compound selected from the group consisting of styrene, alpha-methylstyrene, methyl acrylate, methyl methacrylate, ethyl acrylate, ethyl methacrylate, butyl acrylate, butyl methacrylate, 2-ethylhexyl acrylate, 2-ethylhexyl methacrylate, octyl acrylate, octyl methacrylate, beta-hydroxyethyl acrylate, beta-hydroxyethyl methacrylate, beta-hydroxypropyl acrylate, beta-hydroxypropyl methacrylate, glycidyl acrylate, glycidyl methacrylate, vinyl chloride, vinylidene chloride, divinylbenzene, acrylamide, methacrylamide, N-methylolacrylamide, N-methylolmethacrylamide, vinyl pyridine, acrylonitrile and methacrylonitrile is a coating agent that satisfies the objects of the present invention.

In the copolymer making up the foregoing copolymer latex, the proportion in which the monoethylenically unsaturated carboxylic acid is used is 0.5 – 10% by weight, and preferably 1 – 5% by weight. When this proportion is less than 0.5% by weight, the chemical and mechanical stabilities as well as freeze-thaw stability of the latex are reduced to a marked degree; whereas, when 10% by weight is exceeded, there is a marked increase in the viscosity of the latex when it is being neutralized and stabilized. Further, there is a reduction in the resistance to water and alkalis of the coating obtained from the latex. On the other hand, the proportion of butadiene to monoethylenically unsaturated carboxylic acid plus vinyl compound ranges on a weight basis from 25/75 to 70/30, and preferably 30/70 to 50/50. When there is a deviation from the foregoing range, the effects of preventing the shattering or scattering of the broken glass pieces when the bottle breaks is inadequate.

As the monoethylenically unsaturated carboxylic acids that are usable in the present invention, mention can be made of the monocarboxylic acids such as (meth)acrylic acid, crotonic acid and citraconic acid, the dicarboxylic acids such as itaconic acid and fumaric acid, as well as the anhydrides and monoalkyl esters of these dicarboxylic acids, especially preferred being (meth)acrylic acid.

While the vinyl compounds are selected from the group consisting of styrene, alpha-methylstyrene, methyl (meth)acrylate, ethyl (meth)acrylate, butyl (meth)acrylate, 2-ethylhexyl (meth)acrylate, octyl (meth)acrylate, beta-hydroxyethyl (meth)acrylate, beta-hydroxypropyl (meth)acrylate, glycidyl (meth)acrylate, vinyl chloride, vinylidene chloride, divinylbenzene, (meth)acrylamide, N-methylol (meth)acrylamide, vinyl pyridine and (meth)acrylonitrile, preferred are styrene, methyl methacrylate, ethyl (meth)acrylate, butyl (meth)acrylate, 2-ethylhexyl (meth)acrylate, beta-hydroxyethyl (meth)acrylate, beta-hydroxypropyl (meth)acrylate and glycidyl (meth)acrylate.

The invention copolymer latex is readily prepared by emulsion polymerizing 100 parts by weight of the monomeric mixture along with, for example, an emulsifier, a polymerization initiator, a chain transfer agent and a sequestering agent, using 100 – 200 parts of an ion-exchanged water as the dispersing medium.

While the anionic surfactants and nonionic surfactants are used singly or in conjunction, the anionic surfactants, and especially the long chain alkylsulfates, the long chain alkylarylsulfates, the long chain alkylsulfonates or the long chain alkylarylsulfonates, are used with preference. The emulsifier is preferably added in the lowest possible amount in consideration of the foaming and drying properties of the latex and the resistance to water and alkalis of the resulting coating. Hence, in the case, of the anionic surfactants, for example, usually an amount in the range of 0.1 – 1.0 part by weight per 100 parts by weight of monomer is used.

While the persulfates such as potassium persulfate and ammonium persulfate are principally used as the polymerization initiator, a reducing agent such as sodium bisulfite is also added at times. The polymerization initiator is added in an amount of usually 0.1 – 0.5 part by weight per 100 parts by weight of monomer.

The chain transfer agent is an important factor influencing the film formability and drying property of the latex and the transparency and strength of the resulting coating. It is usually used in an amount of preferably 0.05 – 1.0 part by weight per 100 parts by weight of monomer. Examples of the chain transfer agent include the long chain alkylmercaptans such as n-octylmercaptan, n-dodecylmercaptan and tert.-dodecylmercaptan.

The sequestering agent such, for example, as ethylenediaminetetraacetic acid (EDTA) or N-hydroxyethylethylenediamine trisodium salt is usually used in an amount of 0.01 – 0.2 part by weight per 100 parts by weight of monomer.

The butadiene-containing copolymer is in general defective in its heat resistance and weatherability. Hence, an antioxidant and/or an ultraviolet absorber is usually added to the copolymerized latex to overcome this defect. However, when the antioxidant is a powder, the dispersion of its particles is inadequate, with the consequence that the transparency of the resulting coating becomes exceedingly poor. Thus, it is preferred to dissolve the antioxidant in the monomer in advance of the time the polymerization reaction is to be carried out. The antioxidant is usually added in an amount of 0.1 – 2.0 parts by weight per 100 parts by weight of monomer. As this antioxidant, usable are the amino compounds and the phenol compounds, particularly effective being phenol and the cresol derivatives. As examples of the amino compounds, there is one sold under the trade name of AGE RITE WHITE (a product of Vanderbilt Company, U.S.A.), and as the phenol compounds, there is, for example, one sold under the trade name of SANTO-WHITE POWDER (a product of Monsanto Company, U.S.A.).

A polymerization temperature of 40° – 80°C. is usually used.

When the polymerization has attained the desired conversion, the unreacted monomer is stripped, and thereafter the resin content, pH and viscosity are adjusted. And if it is further desired, thereafter the resin content, pH and viscosity are adjusted. And if it is further desired, various stabilizers are added. The copolymer latex is usually used in accordance with the present invention with a resin content of 30 – 50% by weight.

The copolymer latex obtained in this manner is then coated to a glass bottle in customary manner as by dipping, spraying, etc., and thereafter dried and vulcanized at a temperature of usually 70° – 150°C. If necessary, the coating may be repeatedly applied to obtain a dried coating thickness of 50 – 300 microns.

When functional monomers such as beta-hydroxyethyl (meth)acrylate, glycidyl (meth)acrylate and N-methylol (meth)acrylamide have been chosen as the vinyl compound in preparing the invention copolymer latex, the resulting coating can be cross-linked by the addition to the copolymer latex of a small quantity of either a melamine, urea or epoxy resin.

If desired, the glass bottle coated in accordance with the present invention may be further coated with a hard protective layer. As this hard protective layer, preferred is a dried coating formed from such resins as acrylic resin, polystyrene, epoxy resin, unsaturated polyester resin, polyurethane and polycarbonate and having a dried thickness of 50 – 150 microns.

Thus, there is provided according to the present invention, a glass bottle which, as a result of having been coated with the hereinbefore-described copolymer latex, has a rubber coating of a dried thickness of 50 – 300 microns, as well as a glass bottle which, after having been coated with a rubber coating as above described, has been further coated with a hard protective layer having a dried thickness of 50 – 150 microns.

While the glass bottle of this invention is used with advantage in the case where the internal pressure becomes relatively high such as in the case of beer bottles, cola bottles and other carbonated beverage bottles and aerosol containers, it goes without saying that it is also usable in the case where the internal pressure does not become high.

In the case of the coated glass bottle of the present invention, not only is there no damage resulting from organic solvents at the time the bottles are coated, but also the resistances to water and alkalis of the coating formed excel those of the coatings formed by the rubber latex other than the copolymer latex of the present invention, polyacrylic acid ester emulsion and ethylene-vinyl acetate copolymer emulsion. Further, the shattering or scattering of the broken glass pieces at the time of the breakage of the bottle can be satisfactorily prevented.

The following examples will now be given for more specifically illustrating the invention. The parts and percentages used in the examples are on a weight basis.

EXAMPLE 1

A 100-liter glass-lined stainless steel autoclave was purged with nitrogen and then charged with 40 parts of butadiene, 37 parts of styrene, 20 parts of methyl methacrylate, 3 parts of methacrylic acid, 150 parts of ion-exchanged water, 0.6 part of sodium alkylbenzenesulfonate, 0.2 part of n-dodecylmercaptan, 0.15 part of potassium persulfate and 0.05 part of EDTA, following which this mixture was reacted for 10 hours at 60°C. with stirring to prepare a copolymer latex at a conversion of 95%. After stripping the unreacted monomer, the so obtained latex was concentrated to a resin content of 45%, and its pH was adjusted to 8.5.

Commercially available empty bottles for carbonated beverage use were dipped in this latex, dried at room temperature and thereafter heated for 30 minutes at 100°C. This dipcoating and drying operation was repeated, and bottles having varying coating thicknesses (by the expression "coating thickness," as used here and hereafter, is meant the dried coating thickness) as shown in the following Table 1 were prepared.

The so obtained coated bottles were charged with sodium bicarbonate and dilute sulfuric acid and sealed with crown caps. After holding these bottles at 40°C. and bringing the internal pressure of these bottles to 5.0 kg/cm², the following test was conducted. A 500-grams steel ball attached to one end of a cord 160 centimeters in length was allowed to freely swing and collided against the middle of the bottle from an angle indicated in Table 1, below. The state of the breakage of the bottle was observed, and the effects of the coating in preventing the shattering or scattering of the broken glass pieces were determined. In the case of an uncoated bottle, there was complete destruction of the bottle, and broken glass pieces were scattered to a distance of over 5 meters from the place where the breakage of the bottle took place. The results obtained are shown in the following Table 1.

Table 1

| Run | Coating thickness ($\mu$) | Angle of release of ball (degree) | Results |
|---|---|---|---|
| 1 | 40 | 40 | X |
| 2 | 80 | 40 | O |
| 3 | 110 | 40 | ⊚ |
| 4 | 110 | 50 | O |
| 5 | 145 | 60 | ⊚ |
| 6 | 200 | 70 | ⊚ |
| 7 | 250 | 80 | ⊚ |

Note.- The symbols used in evaluating the results, as used in the above table and the subsequent tables given herein, have the following meanings.
⊚: Although part of the coating was ruptured, its original form was maintained.
O: Although rupture of the coating was great, there was no scattering of the broken glass pieces.
X: The breakage of the bottle was great, and the broken glass pieces were scattered.

EXAMPLE 2

A 1-liter autoclave was employed, and the experiment was carried out by operating as in Example 1 but using as monomers butadiene, styrene, methyl methacrylate and methacrylic acid, as indicated in Table 2, below, to prepare the copolymer latices. Using these latices, bottles were coated to a thickness of 150 microns with these latices. These coated bottles were then tested for their shatterproofness as in Example 1 with an internal pressure of 2.5 kg/cm² at 30°C. and an angle of 40°. The results obtained are shown in the following Table 2.

Table 2

| Run | Butadiene | Styrene | Methyl methacrylate | Methacrylic acid | Results |
|---|---|---|---|---|---|
| 1 | 20 | 57 | 20 | 3 | X |
| 2 | 25 | 52 | 20 | 3 | O |
| 3 | 30 | 47 | 20 | 3 | ⊚ |
| 4 | 35 | 42 | 20 | 3 | ⊚ |
| 5 | 35 | 0 | 62 | 3 | ⊚ |
| 6 | 40 | 0 | 57 | 3 | ⊚ |
| 7 | 40 | 57 | 0 | 3 | ⊚ |
| 8 | 50 | 37 | 10 | 3 | ⊚ |
| 9 | 60 | 27 | 10 | 3 | ⊚ |
| 10 | 75 | 7 | 15 | 3 | X | and methacrylic acid, as indicated in Table 3, below, to prepare the copolymer latices. Using these latices, bottles were coated to a thickness of 150 microns with these latices. Next, atop this coating was applied, as a 50% solution, a 1:1 (weight) mixture of an epoxy resin (a mixture of 70 weight % of diglycidyl ether of bisphenol A and 30 weight % of di(2-methylglycidyl)ether of bisphenol A) and a curing agent therefor (a condensed polyamide of a fatty acid and diethylenepolyamine) followed by heating the coated bottles for 30 minutes at 100°C. The thickness of this second coating was 100 microns.

The shatterproofness of the so coated bottles was then tested by causing a steel ball to collide with the bottles under the conditions of a temperature of 40°C., an internal pressure of 5.0 kg/cm² and an angle of release of the ball of 40°. The transparency of the coated bottles was satisfactory in all cases. The results obtained are shown in Table 3, below.

Table 3

| Run | Butadiene | Styrene | Methyl methacrylate | Methacrylic acid | Results |
|---|---|---|---|---|---|
| 1 | 20 | 57 | 20 | 3 | X |
| 2 | 25 | 52 | 20 | 3 | ⊚ |
| 3 | 30 | 47 | 20 | 3 | ⊚ |
| 4 | 40 | 37 | 20 | 3 | ⊚ |
| 5 | 50 | 27 | 20 | 3 | ⊚ |
| 6 | 55 | 22 | 20 | 3 | O |

EXAMPLE 4

A 1-liter autoclave was used, and the experiment was carried out by operating as in Example 1 but using the monomers as indicated in the following Table 4 to prepare the copolymer latices, after which bottles were coated with the so obtained latices to a coating thickness of 150 microns. The shatterproofness of the resulting bottles was then examined by causing the collision of a steel ball with the coated bottles under the conditions of a temperature of 30°C., internal pressures of either 2.5 or 4.0 kg/cm², and an angle of release of the ball of 40°. The results obtained are shown in Table 4, below.

Table 4

| | Monomer (part) | | | | | | | Results | |
|---|---|---|---|---|---|---|---|---|---|
| Run | Butadiene | Styrene | Methyl methacrylate | Acrylic Acid | Methacrylic acid | Fumaric acid | Itaconic acid | Internal pressure 2.5 kg/cm² | Internal pressure 4.0 kg/cm² |
| 1 | 35 | 43 | 20 | 2.0 | — | — | — | ⊚ | ⊚ |
| 2 | 35 | 43 | 20 | 1.5 | — | 0.5 | — | ⊚ | ⊚ |
| 3 | 35 | 43 | 20 | 1.5 | — | — | 0.5 | ⊚ | ⊚ |
| 4 | 35 | 44.5 | 20 | — | 0.5 | — | — | ⊚ | O |
| 5 | 35 | 44 | 20 | — | 1.0 | — | — | ⊚ | O |
| 6 | 35 | 43 | 20 | — | 2.0 | — | — | ⊚ | ⊚ |
| 7 | 35 | 40 | 20 | — | 5.0 | — | — | ⊚ | ⊚ |
| 8 | 35 | 20 | — | 10.0 | — | — | — | ⊚ | ⊚ |

EXAMPLE 3

A 1-liter autoclave was used, and the experiment was carried out by operating as in Example 1 but using as monomers butadiene, styrene, methyl methacrylate

EXAMPLE 5

A 1-liter autoclave was used, and the experiment was carried out as in Example 1 to prepare copolymer latices, except that the monomers were used as indicated in the following Table 5. Bottles were then coated with the so obtained latices to a coating thickness of 150 microns. The shatterproofness of the so obtained bottles was then tested by causing a steel ball to collide with the coated bottles under the conditions of a temperature of 40°C., an internal pressure of 5.0 kg/cm², and an angle of release of the ball of 40°. While the transparency of the coated bottles of Runs 1 – 6 was satisfactory, that of Run 7 was somewhat inferior. The results obtained are presented in Table 5, below.

tion of an aqueous latex of a copolymer comprising (1) 25 – 70% by weight of butadiene, (2) 0.5 – 10% by weight of a monoethylenically unsaturated carboxylic acid and (3) 20 – 74.5% by weight of at least one vinyl compound selected from the group consisting of styrene, alpha-methylstyrene, methyl acrylate, methyl methacrylate, ethyl acrylate, ethyl methacrylate, butyl acrylate, butyl methacrylate, 2-ethylhexyl acrylate, 2-ethylhexyl methacrylate, octyl acrylate, octyl methacrylate, beta-hydroxyethyl acrylate, beta-hydroxyethyl Table 5

| Run | Butadiene (parts) | Methacrylic acid (parts) | Styrene (parts) | Other vinyl compounds Class | Amount added (parts) | Results |
|---|---|---|---|---|---|---|
| 1 | 35 | 3 | 52 | methyl methacrylate | 10 | ◉ |
| 2 | 35 | 3 | 52 | ethyl acrylate | 10 | ◉ |
| 3 | 35 | 3 | 52 | butyl acrylate | 10 | ◉ |
| 4 | 35 | 3 | 52 | 2-ethylhexyl acrylate | 10 | ◉ |
| 5 | 35 | 3 | 47 | methyl methacrylate beta-hydroxyethyl acrylate | 10 5 | ◉ |
| 6 | 35 | 3 | 47 | methyl methacrylate glycidyl methacrylate | 10 5 | 0 |
| 7 | 35 | 3 | 52 | acrylonitrile | 10 | ◉ |

EXAMPLE 6

A 1-liter autoclave was used, and the experiment was operated as in Example 1 but using as monomers butadiene, styrene and acrylic acid as indicated in the following Table 6 to prepare the copolymer latices. Bottles were then coated as in Example 3 with the so obtained latices and the epoxy resin. The shatterproofness of the resulting coated bottles was then tested by causing a steel ball to collide with the bottles under the conditions of a temperature of 40°C. (internal pressure of 5.0 kg/cm²) and 70°C. (internal pressure of 1.4 kg/cm²) with the ball released at an angle of 40°. The results obtained are shown in Table 6, below.

Table 6

| | Monomer (part) | | | Results | |
|---|---|---|---|---|---|
| Run | Butadiene | Styrene | Acrylic acid | At 40°C. | At 70°C. |
| 1 | 25 | 73 | 2 | ◉ | O |
| 2 | 30 | 68 | 2 | ◉ | O |
| 3 | 40 | 58 | 2 | ◉ | ◉ |
| 4 | 50 | 48 | 2 | O | ◉ |
| 5 | 60 | 38 | 2 | O | ◉ |

What is claimed is:

1. A glass bottle in which shattering or scattering of broken glass pieces is prevented at the time of the breakage of the bottle, said bottle being obtained by forming a rubber coating to a dried thickness of 50 – 300 microns on the outer surface of a bottle by application of an aqueous latex of a copolymer comprising (1) 25 – 70% by weight of butadiene, (2) 0.5 – 10% by weight of a monoethylenically unsaturated carboxylic acid and (3) 20 – 74.5% by weight of at least one vinyl compound selected from the group consisting of styrene, alpha-methylstyrene, methyl acrylate, methyl methacrylate, ethyl acrylate, ethyl methacrylate, butyl acrylate, butyl methacrylate, 2-ethylhexyl acrylate, 2-ethylhexyl methacrylate, octyl acrylate, octyl methacrylate, beta-hydroxyethyl acrylate, beta-hydroxyethyl methacrylate, beta-hydroxypropyl acrylate, beta-hydroxypropyl methacrylate, glycidyl acrylate, glycidyl methacrylate, vinyl chloride, vinylidene chloride, divinylbenzene, acrylamide, methacrylamide, N-methylolacrylamide, N-methylolmethacrylamide, vinyl pyridine, acrylonitrile and methacrylonitrile.

2. The glass bottle of claim 1 wherein the component (2) of said copolymer is 1 – 5% by weight of acrylic acid.

3. The glass bottle of claim 1 wherein the component (2) of said copolymer is 1 – 5% by weight of methacrylic acid.

4. The glass bottle of claim 1 wherein the weight ratio of component (1) to components (2) plus (3) of said copolymer ranges from 30/70 to 50/50.

5. The glass bottle of claim 1 wherein said monoethylenicially unsaturated carboxylic acid component (2) is selected from the group consisting of acrylic acid, methacrylic acid, crotonic acid, citraconic acid, itaconic acid, fumaric acid, anhydride of itaconic acid, anhydride of fumaric acid, monoalkyl ester of itaconic acid and monoalkyl ester of fumaric acid, said component (2) comprising 1–5% by weight of said copolymer.

6. The glass bottle of claim 1 which contains an additional coating of a hard protective layer of a resin selected from the group consisting of acrylic resin, polystyrene, epoxy resin, unsaturated polyester resin, polyurethane and polycarbonate, said protective layer having a dried thickness of 50–150 microns.

* * * * *